A. J. LOEPSINGER.
PRESSURE GAGE.
APPLICATION FILED MAY 21, 1910.

1,189,706.  Patented July 4, 1916.

WITNESSES
J. H. Thurston
John Hinshaw

INVENTOR.
Albert J. Loepsinger,
By Wilmarth H. Thurston,
ATTORNEY.

UNITED STATES PATENT OFFICE.

ALBERT J. LOEPSINGER, OF PROVIDENCE, RHODE ISLAND, ASSIGNOR TO GENERAL FIRE EXTINGUISHER COMPANY, OF NEW YORK, N. Y., A CORPORATION OF NEW YORK.

PRESSURE-GAGE.

1,189,706.  Specification of Letters Patent.  Patented July 4, 1916.

Application filed May 21, 1910.  Serial No. 562,746.

*To all whom it may concern:*

Be it known that I, ALBERT J. LOEPSINGER, of the city and county of Providence and State of Rhode Island, have invented certain new and useful Improvements in Pressure-Gages; and I do hereby declare the following specification, taken in connection with the accompanying drawings, forming a part of the same, to be a full, clear, and exact description thereof.

In certain relations where pressure gages are used the normal pressures to which the gage is ordinarily subjected are comparatively small, but at times the gage may be temporarily subjected to a much greater pressure. In such cases it is much more important that provision be made for accurately reading the low normal pressures than is the case with the high and abnormal or unusual pressures.

The object of the present invention is to provide a construction of pressure gage which will enable the face of the gage to be provided with relatively fine graduations for accurate reading up to a certain pressure, and then to be provided beyond that point with relatively coarse graduations. To enable the face of a pressure gage to be graduated in such manner, it is evident that the pointer of the gage must, at different points of its travel, be given different amounts of movement for a given increase of pressure corresponding to the method of graduating the face of the gage above referred to.

The present invention consists in a novel and peculiar combination of parts whereby the pointer of a pressure gage will be caused to move a certain distance for each unit of increased pressure through a portion of its total range of travel, and then will be caused to move a certain other distance for each unit of increased pressure through another portion of its total range of travel.

Figure 1:
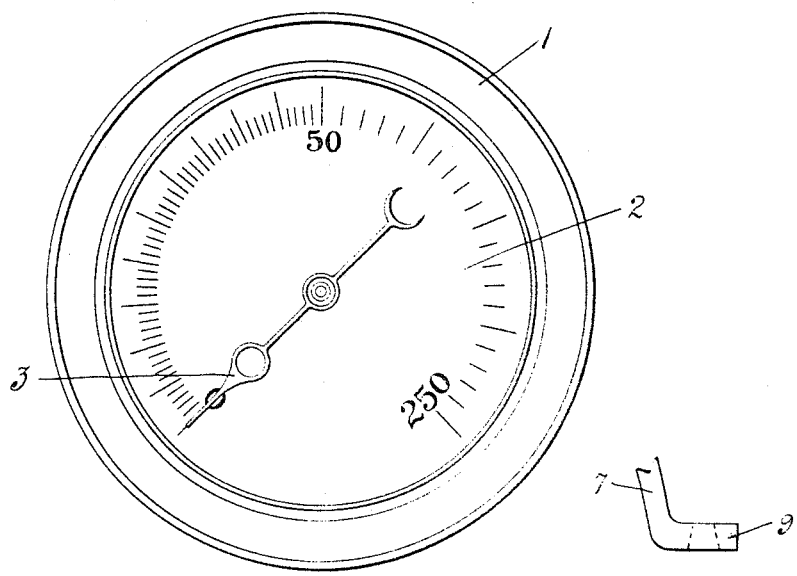
Figure 3:
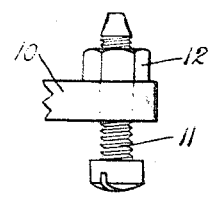
Figure 2:
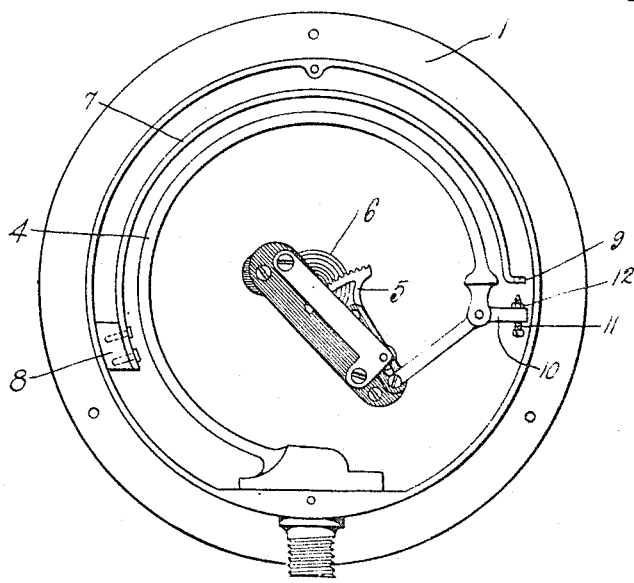

Referring to the drawings, Figure 1 is a front view of a pressure gage embodying my invention; Fig. 2 is a corresponding view with the face of the gage removed to show the interior construction; and Fig. 3 is a detail.

The gage shown in the drawings is adapted to indicate pressure up to two hundred and fifty pounds, but the construction is such that in indicating a pressure of fifty pounds, or one-fifth of the total pressure which the gage is adapted to indicate, the pointer is caused to move through one-half of its total range of travel. Accordingly that portion of the face of the gage over which the pointer travels in indicating a pressure of fifty pounds, being one-half of the total range of travel of said pointer, may be, and as shown in Fig. 1 is, provided with correspondingly fine graduations, while that portion of the face over which the pointer travels throughout the remainder of its movement is provided with relatively coarse graduations.

1 represents the casing of the gage, 2 the face thereof provided with graduations as above explained, and 3 the indicating pointer.

4 represents the usual Bourdon tube for actuating the pointer. This Bourdon tube is rigidly secured to the casing at one end in the usual manner, the opposite end of said tube being free to move and being connected to and adapted to operate the usual pointer-actuating mechanism comprising the segment-gear lever 5, a pinion not shown, and the coiled spring 6. In the present construction there is employed, in addition to the Bourdon tube 4, a spring 7. This spring is rigidly secured at one end to the casing, or to a block 8 which is in turn secured to the casing as shown in Fig. 2. Said spring 7 is bent or curved so as to extend partially around the inside of the casing and substantially parallel with the Bourdon tube. The opposite end of the spring 7 is left free, said free end being at substantially right angles to form the projection 9. The Bourdon tube is provided at its free end with a projection 10 in which is mounted an adjusting screw 11, said screw being located in line with the projection 9. A check-nut 12 may be employed to hold said screw in adjusted position. Preferably the end of the screw is tapered and the projection 9 is provided with a tapering aperture to receive the tapered end of said screw, as indicated by dotted lines in Fig. 3.

The operation of the construction above described is as follows: The screw 11 is to be so adjusted that when the gage is subjected to any pressure up to fifty pounds the end of said screw will not make operative contact with the end of the spring 7 or the projection 9 thereof, and so that up to fifty pounds the gage operates in the usual manner, the pointer 3 being operated by the Bourdon tube, the action of which up to a pressure of fifty pounds is unaffected by the presence of the spring 7. When, however, the pressure reaches fifty pounds the end of the screw 11 is brought into operative contact with the projection 9 on the spring 7, and so that as the pressure rises above fifty pounds an additional amount of work is imposed upon the Bourdon tube, by reason of the fact that said Bourdon tube will thereafter not only have to wind up the coiled spring 6, but will also have to overcome the force of the spring 7. As will be understood, the additional amount of work thus imposed upon the Bourdon tube will correspond to the strength of the spring 7, which is to be properly proportioned to produce the amount of restraint upon said tube which may be desired. By means of the adjusting screw 11 the operation of the parts may be accurately adjusted.

By reason of the increased amount of work thus put upon the Bourdon tube by the spring 7, the amount of movement of said tube, and consequently of the pointer, for each pound of increased pressure above fifty pounds will be correspondingly lessened, as compared with the amount of movement of said tube and pointer for each pound of increased pressure below fifty pounds.

In the construction shown in the drawings the strength of the spring 7 is understood to be such that after a pressure of fifty pounds has been reached the pointer will, for each pound of increased pressure, be caused to travel only one-fourth the distance which said pointer will travel when the pressure is below fifty pounds, or in other words, when the pressure is above fifty pounds the pointer will travel through as great an arc in indicating an increase of two hundred pounds in pressure, that is, an increase from fifty pounds to two hundred and fifty pounds, as it travels in indicating an increase of pressure from zero up to fifty pounds.

What I claim as my invention and desire to secure by Letters Patent is:

1. In a pressure gage, the combination, with the pointer and a Bourdon tube for actuating the same, of a spring arranged substantially concentric with said tube and adapted to come into action after the pressure has reached a predetermined point and to thereafter act to retard the movement of the pointer under the operation of said tube.

2. In a pressure gage, the combination, with the pointer and a Bourdon tube for actuating the same, of a spring held fast at one end and with its other end free, said spring being arranged substantially concentric with said tube and adapted to come into action after the pressure has reached a predetermined point and to thereafter act to retard the movement of the pointer under the operation of said tube.

3. In a pressure gage, the combination, with the pointer and a Bourdon tube for actuating the same, of a spring held fast at one end and with its other end free, said spring being arranged substantially parallel with said tube and adapted to come into action after the pressure has reached a predetermined point and to thereafter act to retard the movement of the pointer under the operation of the pointer.

4. In a pressure gage, the combination, with the pointer and a Bourdon tube for actuating the same, of a spring held fast at one end and with its other end free, the free end of said spring being arranged in proximity to the free end of said tube and so as to be engaged thereby when the pressure reaches a predetermined point.

5. In a pressure gage, the combination, with the pointer and a Bourdon tube for actuating the same, said tube being provided with a projection near its free end, of a spring held fast at one end and with its other end free, the free end of said spring being provided with a projection adapted to be engaged by the projection on said tube after the pressure has reached a predetermined point.

6. In a pressure gage, the combination, with the pointer and a Bourdon tube for actuating the same, said tube being provided near its free end with a projection carrying an adjusting screw, of a spring held fast at one end and with its other end free, the free end of said spring being provided with a projection adapted to be engaged by said adjusting screw after the pressure has reached a predetermined point.

ALBERT J. LOEPSINGER.

Witnesses:
W. H. THURSTON,
J. H. THURSTON.